(12) United States Patent
Koto et al.

(10) Patent No.: US 8,509,174 B2
(45) Date of Patent: Aug. 13, 2013

(54) WIRELESS TERMINAL

(75) Inventors: Hideyuki Koto, Saitama (JP); Hajime Nakamura, Saitama (JP); Yasuhiko Hiehata, Saitama (JP)

(73) Assignee: KDDI Corporation, Tokyo (JP)

( * ) Notice: Subject to any disclaimer, the term of this patent is extended or adjusted under 35 U.S.C. 154(b) by 182 days.

(21) Appl. No.: 13/214,853

(22) Filed: Aug. 22, 2011

(65) Prior Publication Data

US 2012/0044810 A1 Feb. 23, 2012

(30) Foreign Application Priority Data

Aug. 20, 2010 (JP) ................................. 2010-184931

(51) Int. Cl.
*H04W 4/00* (2009.01)
(52) U.S. Cl.
USPC .......................................................... 370/329
(58) Field of Classification Search
USPC ........................... 370/310, 328–339, 345, 347
See application file for complete search history.

(56) References Cited

U.S. PATENT DOCUMENTS

| 2010/0238861 | A1* | 9/2010 | Kitahara et al. | 370/328 |
| 2011/0228675 | A1* | 9/2011 | Nakamura et al. | 370/235 |
| 2012/0182867 | A1* | 7/2012 | Farrag et al. | 370/230 |

FOREIGN PATENT DOCUMENTS

| JP | 2003-169363 A | 6/2003 |
| JP | 2010-064100 A | 3/2010 |
| JP | 2010-226342 A | 10/2010 |

OTHER PUBLICATIONS

"Wireless LAN Medium Access Control (MAC) and Physical Layer (PHY) specifications," IEEE Std 802.11ed, 2005, Nov. 11, 2005.

* cited by examiner

*Primary Examiner* — Frank Duong
(74) *Attorney, Agent, or Firm* — Westerman, Hattori, Daniels & Adrian, LLP (57) ABSTRACT

A communication permitted slot setting section 12a randomly and equally divides one prescribed cycle for each wireless terminal and sets some of them, respectively, as permitted slots "p." A communication assigning section 12b assigns the total communication "n" per one cycle pre-assigned to each wireless terminal to each permitted slot "p." A communication timing determining section 12c randomly determines communication timings for each permitted slot "p." A degree-of-congestion measuring section 12d measures the degree of congestion of wireless resources. A connectivity estimating section 12e estimates the connectivity M for each permitted slot. Each time a communication opportunity is consumed, a communication readjusting section 12f assigns the communication opportunity to an permitted slot with a higher connectivity M at a higher probability in the next cycle.

19 Claims, 10 Drawing Sheets

| i | k | (i+k+N) mod 2N [N=4] |
|---|---|---|
| 0 | 0 | 4 |
| 0 | 1 | 5 |
| 0 | 2 | 6 |
| 0 | 3 | 7 |
| 1 | 0 | 5 |
| 1 | 1 | 6 |
| 1 | 2 | 7 |
| 1 | 3 | 0 |
| 2 | 0 | 6 |
| 2 | 1 | 7 |
| 2 | 2 | 0 |
| 2 | 3 | 1 |
| ⋮ | ⋮ | ⋮ |
| 7 | 0 | 3 |
| 7 | 1 | 4 |
| 7 | 2 | 5 |
| 7 | 3 | 6 |

WIRELESS TERMINAL

The present application is claims priority of Japanese Patent Application Serial No. 2010-184931, filed Aug. 20, 2010, the content of which is hereby incorporated by reference in its entirety.

BACKGROUND OF THE INVENTION

1. Field of the Invention

The present invention relates to a wireless terminal for dynamically setting communication timing at time slots where sufficient network resources, such as the wireless channel, are available in order to transmit and receive non-real-time data traffic efficiently.

2. Description of the Related Art

Various kinds of data traffic are transmitted and received by wireless data communication terminals, including Web browsing and transmitting/receiving video streamings, e-mails, and large files, etc. Patent Literature 1 and Nonpatent Literature 1 disclose techniques in which the priorities of real-time required data communications are set at higher levels than those for the non real-time data communications, and wireless resources (time, frequency, and power) are preferentially assigned to such high priority data traffic. In these related arts, even data traffic requiring non real-time performance, with lower priority, is assigned with some wireless resources so that data could be exchanged.

In such techniques where priorities and thus the wireless resource are assigned according to the type of data traffic, all the data traffic is always assigned with some wireless resources according to the priority regardless of the condition of the network. Therefore, even when the network is congested, data traffic requiring non real-time performance is assigned with some wireless resources. From the view point of the telecommunications carrier operating the wireless network, this poses a problem in that even less urgent data traffic requiring non real-time performance are assigned with wireless resources even in a congested situation, where these resources are desired to be assigned to other data traffic requiring real-time performance.

From the view point of users of the wireless access network, this also poses a problem where wireless resources that should be assigned to users of applications requiring real-time performance are assigned to users of applications requiring non real-time performance. Such non real-time applications could require so low priority where the exchange of data needs to be completed, for example, in few days or even weeks. In additions, users of applications requiring non real-time performance may demand lower telecommunication fees in exchange for real-time performance.

In order to address these technical problems, the inventors of the present invention have invented and filed a patent application on a system for transmitting and receiving data traffic requiring non real-time performance during a timing, or specifically a vacant time slot, having sufficient wireless resources (see Patent Literature 2).

However, the degree of congestion of wireless resources varies geographically. In addition, there is also a time-oriented tendency with the volume of traffic at wireless networks, for example at access points or base stations. That is, there could be areas where the volume of traffic increases during working hours (e.g. 8 to 19 o' clock) such as at business districts. There could also be areas where the volume of traffic increases after working hours until around midnight such as at residential areas. Therefore, for the users at business districts, the time slot from the middle of the night until the morning, e.g. dawn, is vacant and for the users at residential areas, general working hours could be regarded as vacant or off-peak hours and time slots. Furthermore, these users could move between these two areas. Therefore, the degree of congestion of wireless resources varies depending on the users behaviors and/or geographical situations of base stations, thus it is difficult to fixedly set a time slot, where sufficient wireless resources is available, in advance.

Meanwhile, focusing on the individual users, since each user is likely to repeat his/her behavior on a 24-hour cycle, wireless resources used by these users often reveal the daily variation on a 24-hour cycle similar to the users' behavior. Therefore, it is possible to monitor and/or estimate the degree of congestion of wireless resources considering this periodicity, and the timing of non-real-time communication can be optimized.

Hence, the inventors of the present invention have further invented and filed a patent application of a wireless terminal for use in a system for transmitting and receiving non real-time data traffic during a time slot having sufficient wireless resources, where the wireless terminal is capable of learning the degree of congestion of wireless resources in an autonomous distributed manner based on the call loss rate (percentage of failed connections) or the successful call rate, with consideration of the daily variation of the wireless resource usage. Based on the learned results, the wireless terminal dynamically sets the timing, or the time slot, for the non real-time data to be exchanged (see Patent Literature 3).

Patent Literature 1: Japanese Published Unexamined Patent Application No. 2003-169363

Patent Literature 2: Japanese Patent Application No. 2009-70456

Patent Literature 3: Japanese Patent Application No. 2010-64100

Nonpatent Literature 1: "Wireless LAN Medium Access Control (MAC) and Physical Layer (PHY) Specifications Amendment 8: Medium Access Control (MAC) Quality of Service Enhancements," IEEE Std. 802.11e, 2005

Patent Literature 3, however, has the following technical problems.

(1) The timings of data communication, which are distributed according to the degree of congestion, are equally assigned from a time slot with higher level of congestion to a time-slot with a lower level of congestion. Therefore, resulting time slots are not accurately assigned according to the precise degree of congestion.

(2) The degree of congestion of wireless resources is represented by the call loss rate. However, it is difficult to accurately represent the degree of congestion of wireless resources only with the call loss rate.

(3) The degree of congestion is determined based on the comparison between the call loss rate and a preset threshold value. However, it is difficult to tune the appropriate value of the threshold so that the obtained results represent the degree of congestion accurately. In addition, the time slots having call loss rates exceeding the threshold value are regarded as having the same degree of congestion, which makes it impossible to compare the degree of congestion between such time slots.

(4) The period of learning for learning and determining the degree of congestion is preset, and the time slots for data communication to be performed are calculated based on the learned results. In other words, the preset learning period is always required before calculating the time slots of data communication. Therefore, when the condition of the congestion varies in a short period of time, such change of the conditions could not be promptly reflected due to the preset period.

(5) Since there are no upper and/or lower limits for the number of communication trials during one time slot, during the assignment of the communication timings from a higher-congestion time slot to a lower-congestion time slot, communication timings may be intensively assigned to some specific time slots. For example, if similar assignments occur in multiple wireless terminals, with the similar condition of the congestion, the time slots with lower-congestion may become congested in the next cycle.

SUMMARY OF THE INVENTION

An object of the present invention is to provide a wireless terminal for transmitting and receiving non-real-time data traffic during a time slot with sufficient wireless resources. The wireless terminal being considered monitors and learns the daily variation of the degree of congestion of wireless resources, and readjusts the timings of data communication to be performed based on the periodicity of the monitored and learned results. In addition, the degree of congestion is represented as a probability and all the calculations and the trials of data communications are performed in an autonomous and distributed manner.

In order to achieve the above object, the present invention relates to a wireless terminal where more communication opportunities are assigned to the time slots with lower-congestion, and as a result data communication thus congestion is dispersed, in which the following measures are taken.

(1) A communication timing determination module for determining a communication timing based on a communication log; and a connection control module for performing communication at the determined communication timing and for recording a log of the communication, wherein the communication timing determination module comprises a permitted slot setting section for dividing one prescribed cycle into a plurality of time slots and for setting some of the time lots as communication permitted slots, a communication assigning section for assigning a communication opportunity to each communication permitted slot based on the total communication per one cycle, a communication timing determining section for determining the timing of the assigned communication opportunity in each communication permitted slot; a connectivity estimating section for estimating the condition of the connectivity, or the congestion, of each communication permitted slot based on the communication log, and a communications readjusting section for readjusting the number of communication opportunities during each communication permitted slot so that more communication opportunities are assigned to a communication permitted slot with a higher connectivity, and wherein communications are performed according to the readjusted number of communication opportunities during the communication permitted time slots and this is repeated in each communication permitted slot and periodically performed as the preset cycle.

(2) The connectivity estimating section is configured to calculate the connectivity of each communication permitted slot as a ratio so that their sum adds to 1 in one cycle thereof, and wherein the communication readjusting section is configured to assign communication opportunities consumed during each communication permitted slot in the current cycle to one of the communication permitted slots in the next and subsequent cycles at a probability according to the ratio of the connectivity.

(3) The communication readjusting section is configured so that each time one communication opportunity is consumed during communication permitted slot in the current cycle, the consumed communication opportunity is assigned to one of the communication permitted slots in the next and subsequent cycles at a probability according to the ratio of the connectivity.

(4) The connectivity of each communication permitted slot is estimated based on one of either the call loss rate or the successful call rate and the average throughput of the communication performed in the communication permitted slot.

(5) The connection control module is configured to forcibly terminate the current communication if the communication holding time or the data volume of communication exceeds a preset maximum value and/or when the throughput becomes lower than a preset lower limit.

The present invention offers the following advantages.

(1) Each time a communication is performed and terminated, the consumed communication opportunity is assigned to the communication permitted slot in the next cycle, which is determined based on the latest connectivity value, i.e. the ratio, M of each communication permitted slot. This results in larger number of communication opportunities, and consequently the communications themselves, in time slots with higher connectivity M. Therefore, effective and efficient utilization of the wireless resources, avoiding the congested time slots, is realized.

(2) The connectivity M of each communication permitted slot is calculated as a ratio where their sum adds up to 1 in one cycle thereof. As a result, the consumed communication opportunities are assigned to time slots with a higher probability, or ratio, meaning a higher connectivity in the next cycle. Therefore, communication opportunities can be accurately distributed to each communication permitted slot according to the degree of congestion (connectivity).

(3) The means for readjusting the number of communication opportunity is configured so that each time one communication opportunity is consumed during each communication permitted slot in the current cycle, the consumed communication opportunity is assigned to one of the communication permitted slots in the next and subsequent cycles. As a result, more accurate response and reflection of the variance of the conditions of the congestion in a short period of time to the number of communication opportunities could be realized.

(4) The connectivity of each communication permitted slot is estimated based not only on the call loss rate or the successful call rate but also with the throughput of data communication, which allows the condition of congestion and wireless resources during data communication to be estimated more accurately.

(5) The communication is terminated forcibly when the throughput decreases or the communication holding time or the volume of transferred data communication increases to their preset limits. As a result, inefficient data communications, such as those with very small throughput, very large holding time, etc. are prevented, and the wireless resources are more effectively and efficiently utilized.

DETAILED DESCRIPTION OF THE PREFERRED EMBODIMENTS

Figure 1:
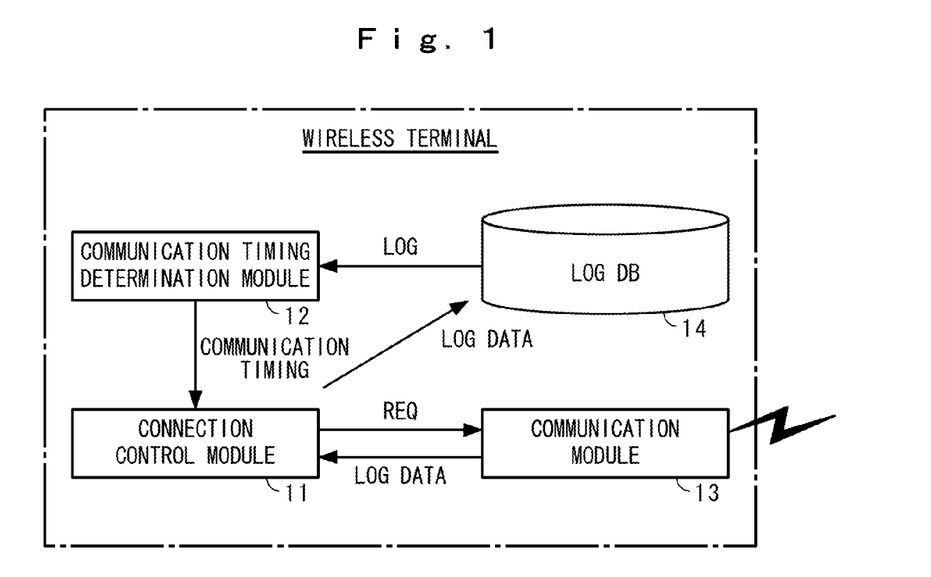
FIG. 1 is a functional block diagram of a wireless terminal according to the present invention.

FIG. 1 is a functional block diagram showing the configuration of a wireless terminal according to the present invention, where components unnecessary for the description of the present invention are not shown.

A connection control module 11 sends a connection request to a communication functional module 13 at communication timing sent from a communication timing determination module 12. The communication functional module 13 proceeds with connection processing in response to the connection request and sends success or failure states of the connection and throughput as log data to the connection control module 11. The connection control module 11 then sends the received log data to a log database 14.

The log database 14 records the received log data. The communication timing determination module 12 readjusts the communication timing based on the log data read out of the log database 14 and sends the readjusted communication timing to the connection control module 11.

Figure 2:
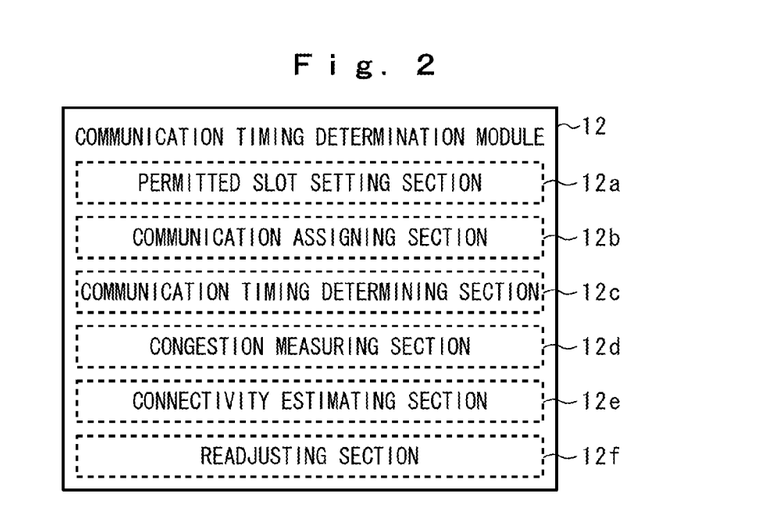
FIG. 2 is a block diagram of a communication timing determination module.
Figure 3:
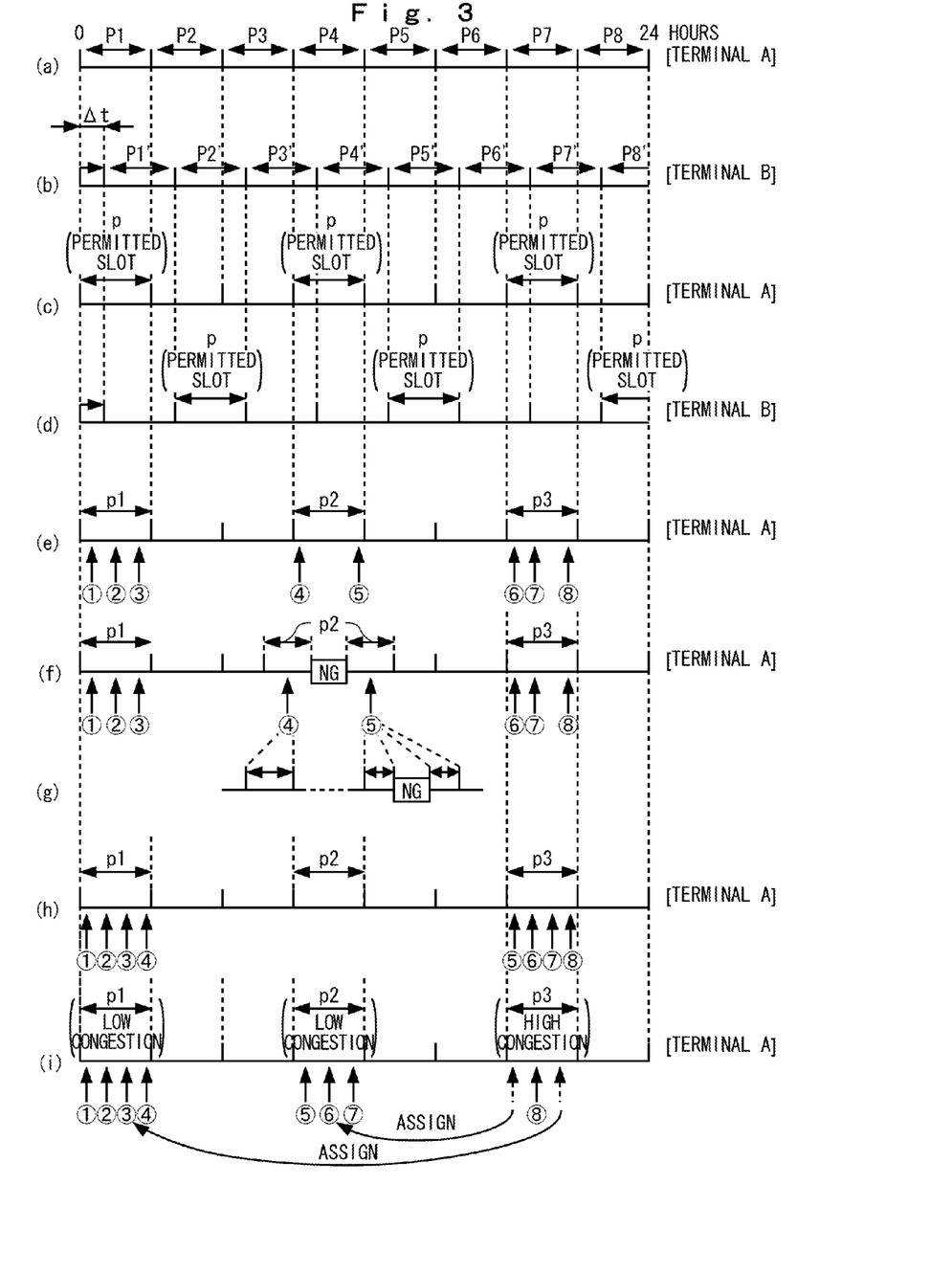
FIG. 3 shows a method for assigning and readjusting communication timings.

FIG. 2 is a block diagram showing the configuration of the communication timing determination module 12. FIG. 3 shows a method for initializing and readjusting communication timings based on the log data.

In FIG. 2, a communication permitted slot setting section 12a randomly sets an initial point, or the start time, of one cycle which time period is preset (e.g. 24 hours) in each wireless terminal, and then equally divides the one cycle into multiple time slots and sets some of them as communication permitted slots "p" during which communication is permitted. Since the initial point of the cycle is randomly set, the start and the end time of the equally divided time slots are desynchronized between wireless terminals. For example, a wireless terminal A undergoes eight-way division with reference to the hour as shown in FIG. 3 (*a*), while a wireless terminal B undergoes eight-way division with reference to the timing shifted by Δt from the hour as shown in FIG. 3 (*b*). For the wireless terminal A, three time slots P1, P4, and P7 are set as the permitted slots "p" as shown in FIG. 3 (*c*). For the wireless terminal B, three time slots P2, P5, and P8 are set as the permitted slots "p" as shown in FIG. 3 (*d*).

A communication assigning section 12b assigns the total number of the communications "n" per one cycle, which is pre-assigned to each wireless terminal, to each permitted slot "p" according to the connectivity M. A communication timing determining section 12c randomly determines the communication timings of the assigned number of communications for each permitted slot "p". For example, as shown in FIG. 3 (*e*), three communication opportunities are assigned to the permitted slot p1, two communication opportunities to the permitted slot p2, and three communication opportunities to the permitted slot p3 for the wireless terminal A. The timing of each communication opportunity is determined randomly in each permitted slot.

Each communication opportunity can have a preset duration and, even in the case of failure of connection setup, reconnection may be permitted within such duration. In this preferred embodiment, a connection forbidden time range (NG range) may be provided in each cycle. As shown in FIG. 3 (*f*), the initiation and/or termination timings of a permitted slot including an NG range are expanded by the time corresponding to the duration of the NG range. Further, the NG range may be provided within the duration of each communication opportunity as shown in FIG. 3 (*g*). In this case, the duration of each communication opportunity is also expanded by the time corresponding to the duration of the NG range.

All the permitted slots are not necessarily assigned with a communication opportunity, that is, there may exist a permitted slot with no communication opportunity assigned thereto (p2 in this example), as shown in FIG. 3 (*h*). Further, the total number of the communication "n" per one cycle may vary for each wireless terminal depending on, for example, the contents and charges of contracted services.

A degree-of-congestion measuring section 12d measures the call loss rate and/or throughput at each communication timing as an index representing the degree of congestion of wireless resources. Based on the call loss rate and/or throughput, a connectivity estimating section 12e estimates the connectivity M to be described hereinafter in detail for each permitted slot as an index representing the condition of the connectivity, or in other words congestion. Based on the connectivity M, a communication readjusting section 12f readjusts the number of communication to be assigned to each permitted slot, so that communication opportunities assigned to each permitted slot "p" in the current cycle are assigned to an permitted slot with a higher connectivity M (i.e. lower degree of congestion) at a higher probability in the next cycle as exemplified in FIG. 3 (*i*).

Next, the operation according to a first preferred embodiment of the present invention will be described in detail with reference to the flowchart shown in FIG. 4. In Step S1, the communication timing determination module 12 equally divides one prescribed cycle (24 hours in this embodiment) to set the range of each time slot (see FIGS. 3 (*a*) and 3 (*b*)) where the initial point of the cycle is randomly set. In addition, the communication permitted slot setting section 12a sets some (N) time slots Px as permitted slots (see FIGS. 3 (*c*) and 3 (*d*)). In Step S2, the communication assigning section 12b assigns "n" communication opportunities to each permitted slot.

In Step S3, the communication timing determining section 12c randomly determines communication timings of the number of communication opportunities assigned to each permitted slot "p" (see FIG. 3 (*e*)). The determined "n" communication timings are sent to the connection control module 11. In Step S4, the connection control module 11 compares the received communication timings with the current time and, at one communication timing, sends a connection request to the communication functional module 13 in Step S5.

In response to the connection request, the communication functional module 13 performs predetermined call connection routine to a pre-registered address. In Step S6, the result of the call connection routine is determined as successful or failure (loss), and if the call connection is determined as successful, post-connection communication control is performed in Step S7. If it is determined as failure (loss), the routine goes to Step S11 and, if it does not reach time-out, returns to Step S5, while if it is determined that it reaches time-out, goes to Step S8 as a call loss.

Figure 5:
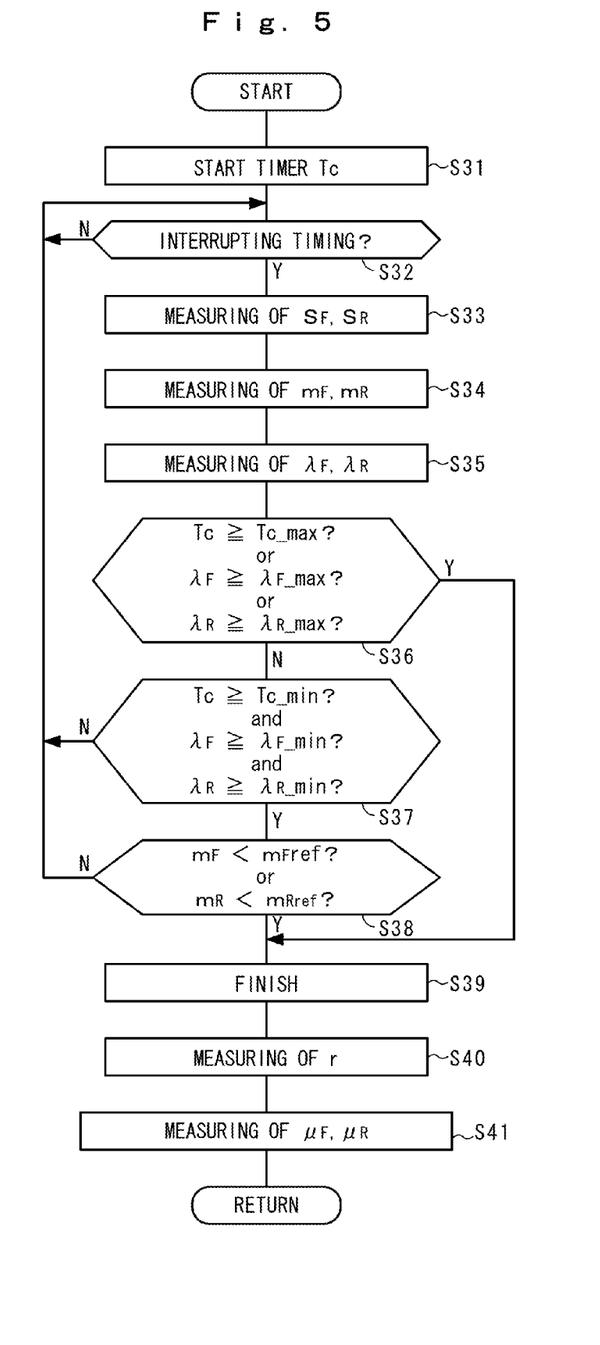
FIG. 5 is a flowchart illustrating a procedure of post-connection communications control.

FIG. 5 is a flowchart illustrating a procedure of the post-connection communication control. In Step S31, the connection holding time $T_c$ starts to be measured. In Step S32, it is determined whether or not it reaches interruption timing at which the degree of congestion of wireless traffic is measured. If it is determined that it reaches interruption timing, the uplink instantaneous throughput $S_F$ and downlink instantaneous throughput $S_R$ are measured in Step S33. These instantaneous throughputs $S^F$ and $S_R$ are measured repeatedly at each interruption timing, which is relevant to the current communication opportunity.

In Step S34, based on the history of the instantaneous throughputs $S_F$ and $S_R$, the uplink average throughput $m_F$ and downlink average throughput $m_R$ during the current communication opportunity (hereinafter referred to as communication opportunity average throughput) are measured. These communication opportunity average throughputs $m_F$ and $m_R$ are obtained based on the instantaneous throughputs $S_F$ and $S_R$ acquired from the first to the latest interruption timing during the current communication opportunity as, for example, an exponential smoothing moving average thereof, and are utilized in Step S38 below as an index for determining whether or not to terminate communications during the current communication opportunity due to throughput reduction which reaches its lower limit.

In Step S35, based on the communication opportunity average throughputs $m_F$ and $m_R$, the data volume of uplink communication $\lambda_F$ and the data volume of downlink communication $\lambda_R$ are calculated. It is noted that in the case of obtaining the data volume of communication not from the communication opportunity average throughputs $m_F$ and $m_R$ but by directly measuring the volume of data exchanged, the measurement of the data volume of uplink communication $\lambda_F$ and the data volume of downlink communication $\lambda_R$ have to be started concurrently with the start of measuring the connection holding time $T_c$ in Step S31.

In Step S36, it is determined whether or not the current communication satisfies the termination condition. In this preferred embodiment, when the communication holding time $T_c$ exceeds its upper limit $T_{c\_}max$, or when the data volume of uplink communication $\lambda_F$ exceeds its upper limit $\lambda_{F\_}max$, or the data volume of downlink communication $\lambda_R$ exceeds its upper limit $\lambda_{R\_}max$, it is determined that the termination condition is satisfied and prescribed termination processing of data communication is performed in Step S39, so that the communication is terminated. If it is determined that the termination condition is not satisfied, the routine goes to Step S37.

In Step S37, it is determined whether or not a minimum guaranteed condition promised to users is satisfied. In this preferred embodiment, if any or all of three conditions that (1) the communication holding time $T_c$ exceeds its lower limit $T_{c\_}min$, (2) the data volume of uplink communication $\lambda_F$ exceeds its lower limit $\lambda_{F\_}min$, and (3) the data volume of downlink communication $\lambda_R$ exceeds its lower limit $\lambda_{R\_}min$ are satisfied, it is determined that the minimum guaranteed condition is satisfied and the routine goes to Step S38. Otherwise the routine returns to Step S32 to keep the communication connected.

In Step S38, it is determined whether or not the condition of the wireless network and its resources are in a severely congested state. In this preferred embodiment, if the uplink communication opportunity average throughput $m_F$ is lower than a reference throughput $m_{F\_}ref$ or the downlink communication opportunity average throughput $m_R$ is lower than a reference throughput $m_{R\_}ref$, it is determined that the wireless network and its resources are in a severely congested state and prescribed termination processing is performed in Step S39, so that the communication is terminated forcibly. Otherwise the routine returns to Step S32 to keep the communication connected.

In Step S40, the successful call rate "r" (complement of the call loss rate) is calculated based on the current communication results. In this preferred embodiment, a call loss is represented by "0" while a successful call is represented by "1" and, based on the results of communication opportunities that have already been terminated in the current permitted slot pi, the successful call rate "r" of the current permitted slot is calculated and updated as, for example, an exponential smoothing moving average thereof.

In Step S41, the uplink average throughput $\mu_F$ and the downlink average throughput $\mu_R$ of the current permitted slot "p" to which the current communication opportunity is assigned (hereinafter referred to as permitted slot average throughput) are obtained based on the communication opportunity average throughputs $m_F$ and $m_R$ that have been assigned to the current permitted slot "p" and already been terminated as, for example, an exponential smoothing moving average thereof.

Referring again to FIG. 4, in Step S8, the log data including the results of the current communication (call loss and the state of the communication termination), the holding time $T_c$, and the permitted slot average throughputs $\mu_F$ and $\mu_R$ are recorded as the communication log from the communication functional module 13 through the connection control module 11 into the log database 14.

In Step S9, based on the recorded communication log, the connectivity M, which represents the condition of the connection connectivity for each permitted slot "p" is calculated by the following Formula (1). That is, in this preferred embodiment, the connectivity M of all the permitted slots in one cycle sums up to "1", meaning that the calculated values of connectivity M could be regarded as a form of probability.

[Formula 1]

$$M[i \bmod N] := \frac{w_1 r[i \bmod N] + w_2 \dfrac{\mu_F[i \bmod N]}{\max\_down} + w_3 \dfrac{\mu_R[i \bmod N]}{\max\_up}}{\sum_{j=0}^{N-1}\left[w_1 r[j \bmod N] + w_2 \dfrac{\mu_F[j \bmod N]}{\max\_down} + w_3 \dfrac{\mu_R[j \bmod N]}{\max\_up}\right]} \quad (1)$$

Here, the references w1, w2, and w3 are the weighting coefficients, respectively, of the successful call rate "r," the uplink permitted slot average throughput $\mu_F$ and the downlink permitted slot average throughput $\mu_R$ represent as indexes of the degree of congestion. The references max_up and max_down are maximum values, respectively, of the uplink throughput and the downlink throughput. The reference "i" is an identifier (ordinal number) to be incremented each time the time elapsed since a prescribed absolute time reaches the duration of each permitted slot "p", that is preset based on the absolute time and assigned to the permitted slot "p." N represents the number of permitted slots per one cycle. Therefore, if the number of permitted slots per one cycle N is 4, the connectivity M (j), M (j+1), M (j+2), and M (j+3) of the latest four permitted slots pj, pj+1, pj+2, and pj+3 including the current slot, are calculated and updated as probability values summing up to "1", based on their respective communication logs.

In Step S10, based on the connectivity M in one cycle, the number of communication to be assigned to each permitted slot "p" is readjusted. Here, a permitted slot "p" to be assigned in the next cycle for the current communication opportunity just consumed is determined.

Figure 6:
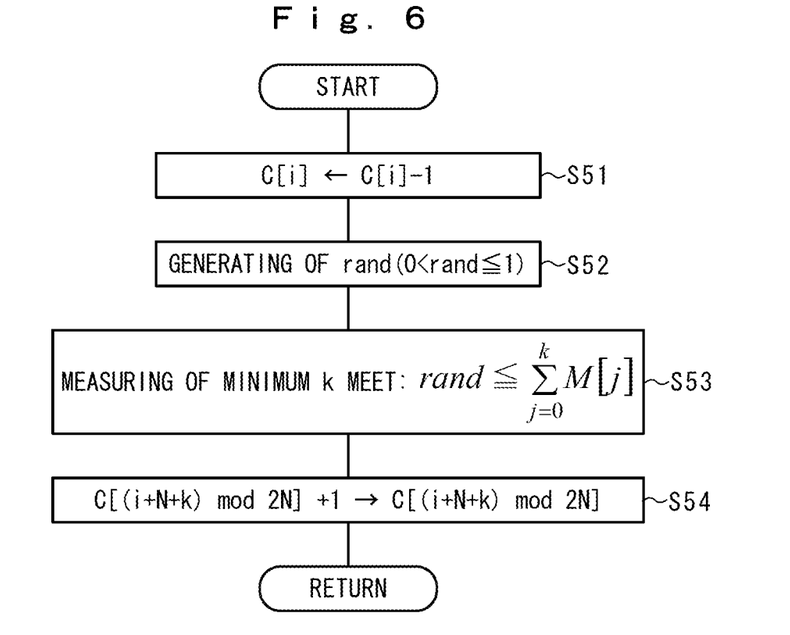
FIG. 6 is a flowchart illustrating a procedure of communication readjusting.

FIG. 6 is a flowchart illustrating a procedure of the communication readjusting. In Step S51, the number of communication opportunities C [j] of the current permitted slot pj is decremented according to the number of consumed communication opportunities. That is, when one communication opportunity is consumed, it is subtracted by "1". In Step S52, a uniform random number "rand" (0<rand≦1) is generated. In Step S53, a permitted slot identifier "k" (k=0 to N−1) for identifying the permitted slot "p" to which the currently consumed communication opportunity to be assigned in the next and subsequent cycles is calculated. Specifically, the permitted slot "p" for the consumed communication opportunity to be assigned is calculated as a minimum value (min k) that meets the following Formula (2) based on the connectivity M.

[Formula 2]

$$rand \leq \sum_{j=0}^{k} M[j] \quad (2)$$

Figure 7:
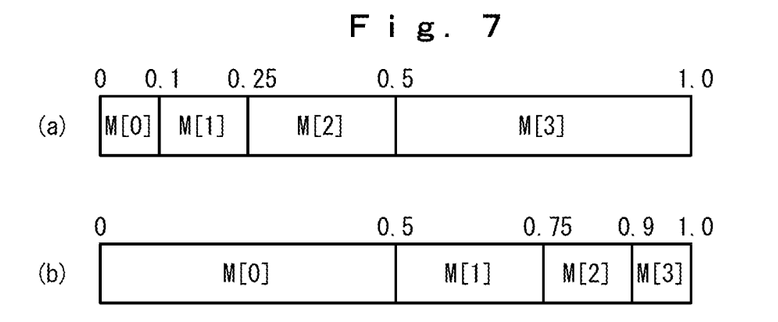
FIG. 7 illustrates the meaning of a permitted slot identifier "k"

FIG. 7 illustrates the physical meaning of the permitted slot identifier "k." For the purposes of description, the case where four permitted slots are provided in one cycle (N=4) exemplified.

FIG. 7 (a) shows the state of the connectivity M [j] during the permitted slot pj (j=0, 1, 2, 3) of the last one cycle including the current slot. More specifically, M [0]=0.10, M [1]=0.15, M [2]=0.25, and M [3]=0.50. FIG. 7 (b) shows the state where M [0]=0.50, M [1]=0.25, M [2]=0.15, and M [3]=0.10.

In order to assign communication opportunities to the permitted slots with a higher connectivity M i.e. at a higher probability, it is desirable, as shown in FIG. 7 (a), to add communication opportunities to the permitted slot C [0] with the connectivity M [0] at a probability of 10%, while to add communication opportunities to the permitted slot C [2] with the connectivity M [2] at a probability of 25%.

From FIG. 7 (a), the probability for the communication opportunity to be assigned to the permitted slot C [0], with the connectivity of M [0], is 10%, which is equal to the probability of 0<rand≦0.10 in Formula (2) and thus the permitted slot identifier "k" being "0." Therefore, the communication opportunity should be assigned to the permitted slot C [0] when the permitted slot identifier "k" becomes "0". Likewise, the probability for the communication opportunity to be assigned to the permitted slot C [2], with the connectivity M [2], is 25%, which is equal to the probability of 0.25<rand≦0.50 in Formula (2) and thus the permitted slot identifier "k" being "2". Therefore, the communication opportunity should be assigned to the permitted slot C [2] when the permitted slot identifier "k" becomes "2."

Similarly, in FIG. 7 (b), the probability for the communication opportunity to be assigned to the permitted slot C [0], with the connectivity M [0], is 50%, which is equal to the probability of 0<rand≦0.50 in Formula (2) and thus the permitted slot identifier "k" being "0." Therefore, the communication opportunity should be assigned to the permitted slot C [0] when the permitted slot identifier "k" becomes "0." Likewise, the probability for the communication opportunity to be assigned to the permitted slot C [2], with the connectivity M [2], is 15%, which is equal to the probability of 0.75<rand≦0.90 in Formula (2) and thus the permitted slot identifier "k" being "2." Therefore, the communication opportunity should be assigned to the permitted slot C [2] when the permitted slot identifier "k" becomes "2."

After the permitted slot identifier "k" for identifying a permitted slot in the next cycle in which the consumed communication opportunity should be assigned is obtained, the routine goes to Step S54. At Step S54, the current permitted slot pj, the number of permitted slots N set in one cycle, and the permitted slot identifier "k" are applied to the following Formula (3), so that the communication opportunities just consumed are assigned to one of the permitted slots and the number of communication opportunities in the permitted slots are updated.

[Formula 3]

$$C[(i+N+k) \bmod 2N] \rightarrow C[(i+N+k) \bmod 2N]+1 \quad (3)$$

Figure 8:
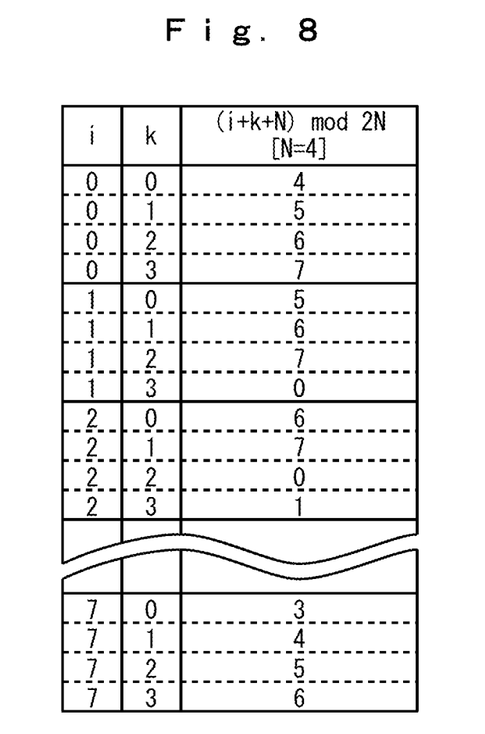
FIG. 8 shows an example result of the calculation of Formula 3.
Figure 9:
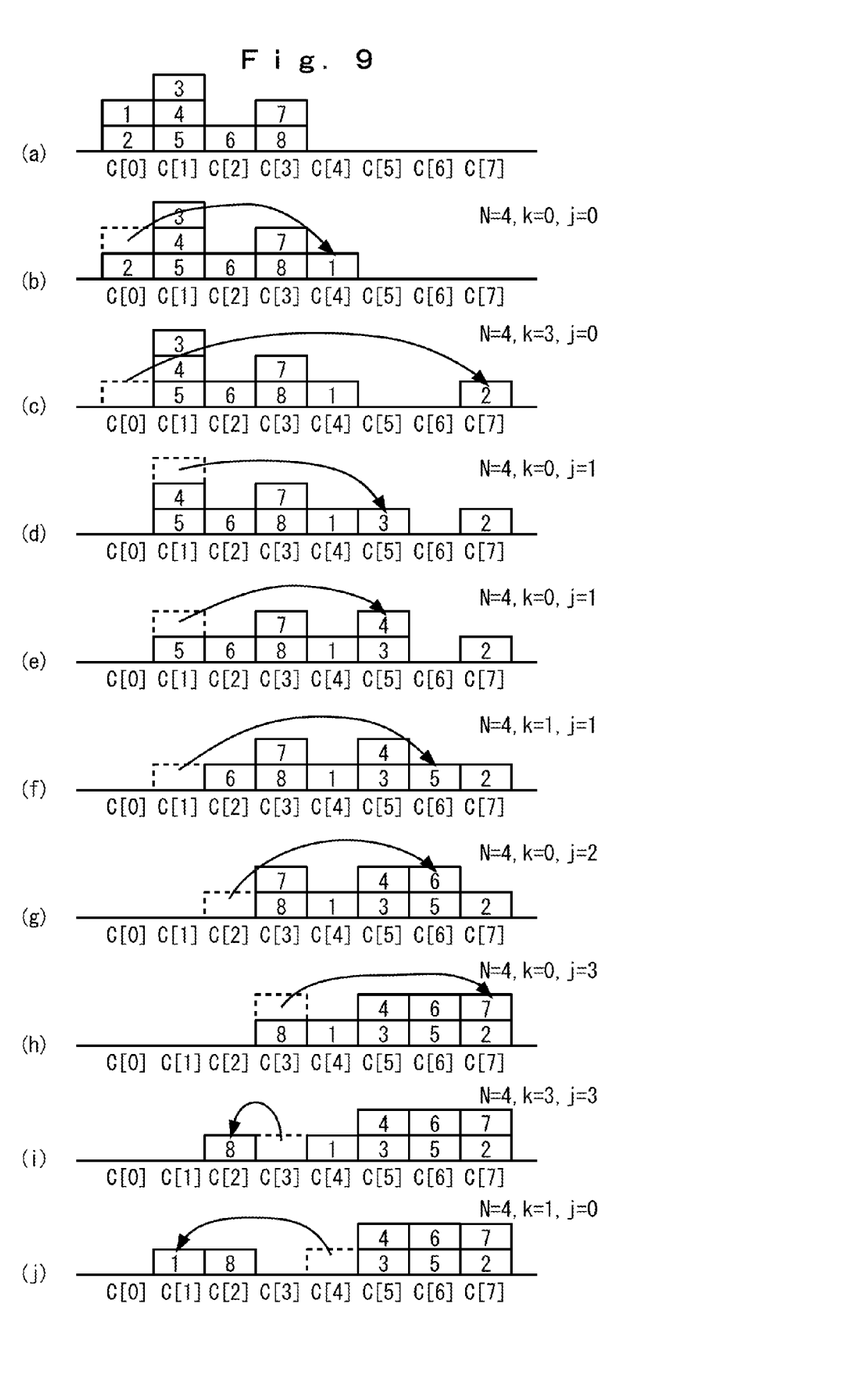
FIG. 9 shows a first method for assigning communication opportunities.

FIG. 8 shows an example result of the calculation of Formula 3. FIG. 9 shows a method for assigning communication opportunities based on Formula 3.

In this preferred embodiment, communication opportunities are assigned to 2N (eight in this embodiment) permitted slots, which corresponds to two cycles including the current permitted slot "p", and are represented as the variables C [j] (j=0 to 7). As shown in FIG. 9 (a), the initial state is as follows. The number of communication opportunity assigned to the current permitted slot C [0] is 2, The number of communication opportunity assigned to the next permitted slot C [1] is 3, the number of communication opportunity assigned to the following permitted slot C [2] is 1, and the number of communication opportunity assigned to the next permitted slot C [3] is 3.

When the first communication opportunity [1] is consumed during the current permitted slot, C [0] is decremented to "1" in Step S51 as shown in FIG. 9 (b). In Step S53, the consumed communication opportunity is assigned to the permitted slot identified by the permitted slot identifier "k" (k=0 in this case) that is calculated. Consequently, the number of communication opportunity C [4] is incremented to "1."

Figure 4:
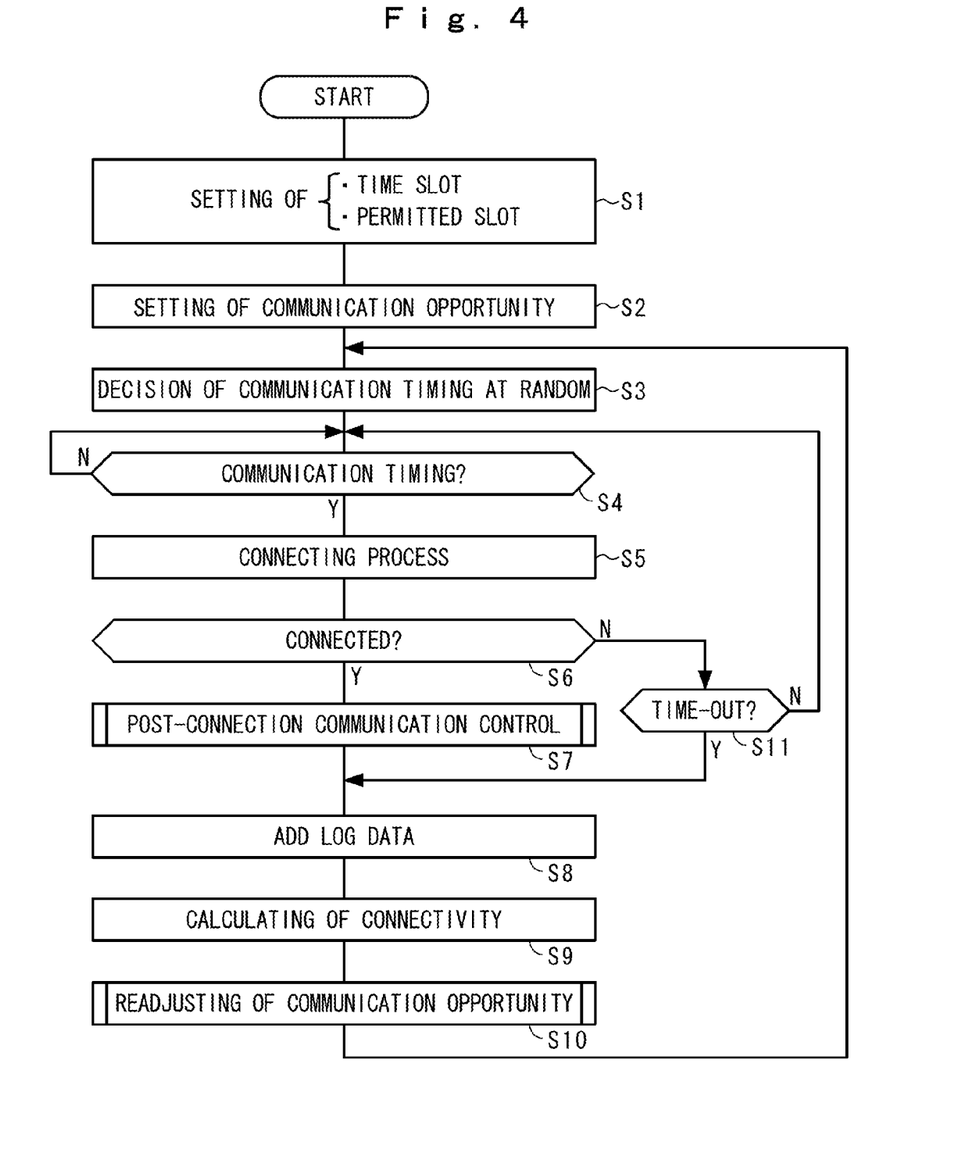
FIG. 4 is a flowchart illustrating an operation according to a first preferred embodiment of the present invention.

After that, the routine returns to Step S4 in FIG. 4 and, when the time becomes to the second communication opportunity during the current permitted slot, we go to Step S5 and the steps following are repeated to perform communications which are the same processing described in the above sections. In Step S9, the connectivity M is updated."

When the second communication is terminated, C [0] is decremented to "0" in Step S51 as shown in FIG. 9 (c) and the communication opportunity is assigned to the permitted slot identified by the permitted slot identifier "k" (k=3 in this case) that is calculated in Step S53. Consequently, the number of communication opportunity C [7] is incremented to "1."

The same applies to the next permitted slot as shown in FIGS. 9 (d), 9 (e), and 9 (f), in which each time three assigned communication opportunities are consumed, the number of communication opportunity C [1] is decremented and the communication opportunities are assigned to the permitted slots identified by the respective permitted slot identifiers "k" (k=0, 0, and 1 in this case). Consequently, the numbers of communication opportunities at C [5], C [5], and C [6] are incremented.

Also in the following permitted slot, when one assigned communication opportunity is consumed, C [2] is decremented and the communication opportunity is assigned to the permitted slot identified by the permitted slot identifier "k" (k=0 in this case). Consequently, C [6] is incremented to "2," as shown in FIG. 9 (g).

Also in the permitted slot after that, each time two assigned communication opportunities are consumed, C [3] is decremented and the communication opportunities are assigned to the permitted slots identified by the respective permitted slot identifiers "k" (k=0 and 3 in this case). Consequently, the numbers of communication opportunities at C [7] and C [2] are incremented, as shown in FIGS. 9 (h) and 9 (i).

After the communication and assignment for one cycle is all performed, the same routine is applied to the communication opportunity in the next permitted slot of the next cycle. So, as shown in FIG. 9 (j), when one assigned communication opportunity is consumed, C [4] is decremented and the consumed communication opportunity is assigned to the permitted slot identified by the permitted slot identifier "k" (k=1 in this case). Consequently, C [1] is incremented.

In accordance with this preferred embodiment, each time a communication opportunity is consumed during each permitted slot, the permitted slot in the next cycle, to which the consumed communication opportunity is assigned, is selected based on the latest connectivity M. As a result, more accurate response and reflection of the variance of the conditions of the congestion in a short period of time to the number of communication opportunities could be realized. In addition, the wireless resources are more effectively and efficiently utilized.

Figure 10:
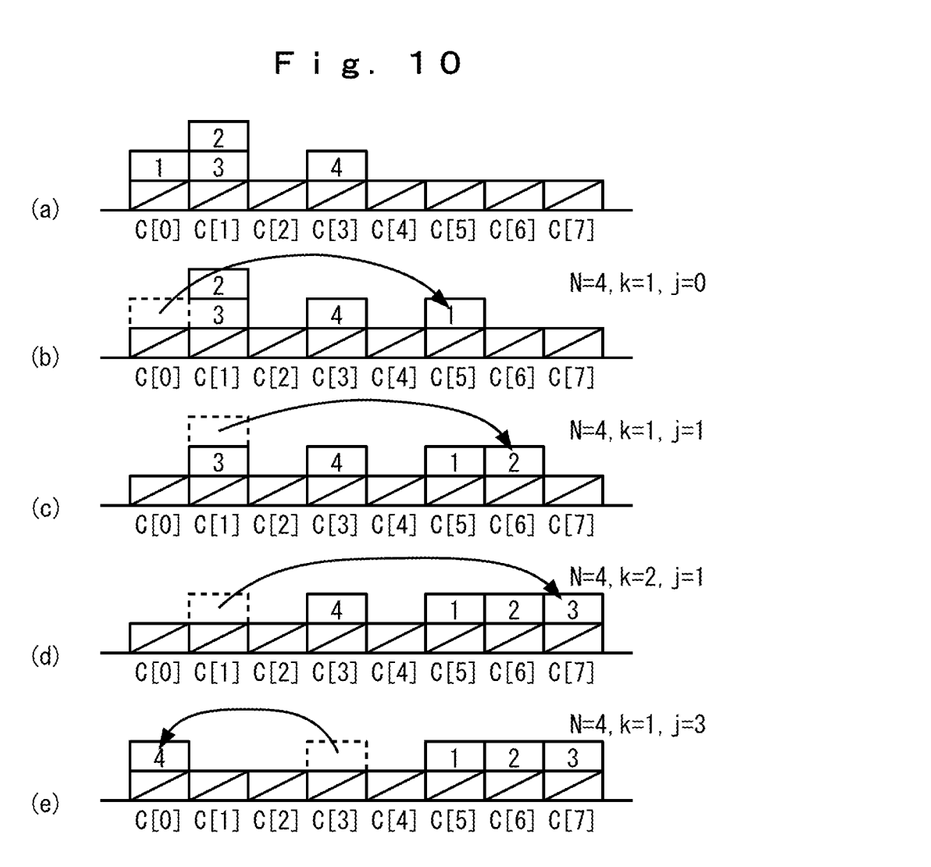
FIG. 10 shows a second method for assigning communication opportunities.

In the case where a lower limit for the number of communication opportunity to be assigned to each permitted slot is set, the number of communication opportunity during each permitted slot is readjusted so that it does not become lower than set lower limit. FIG. 10 shows a method of readjustment when the lower limit is set to "1," where at least one communication opportunity is assigned to each permitted slot. In the case of setting an upper limit to the number of communication opportunity to be assigned to each permitted slot, the number of communication opportunity during each permitted slot is readjusted so that it does not become higher than the set upper limit.

In the above description of the preferred embodiment, each time one communication opportunity is consumed, the consumed communication opportunity is assigned to one of the permitted slots at a probability according to the connectivity M, but the present invention is not restricted thereto. The consumed communication opportunity may be assigned only to the permitted slots having the top $n_{best}$ of the connectivity M (e.g. the top two slots with the highest and the next highest M). In this case, however, the connectivity M for the selected permitted slots, of the top $n_{best}$ connectivity, needs to be recalculated so that the recalculated connectivity represents probability and sums up to 1.

In the above description of the preferred embodiment, for example, when the communication terminal is powered off for some time and powered on again, some permitted slots might be elapsed without consuming the assigned communication opportunities. Therefore, the communication opportunities that are not consumed during such elapsed permitted slots need to be readjusted. In addition, the number of communication opportunities, C [0] to C [7], is calculated based on the connectivity M determined before the timing of power-off. So, when the time duration of power-off is large, the condition of the wireless network and resources, or the connectivity M at each permitted slots, are likely to be different from the one when there is no power-off. Such cases could occur not only when the terminal is powered off, but also when the terminal is moved outside the wireless coverage area.

Figure 11:
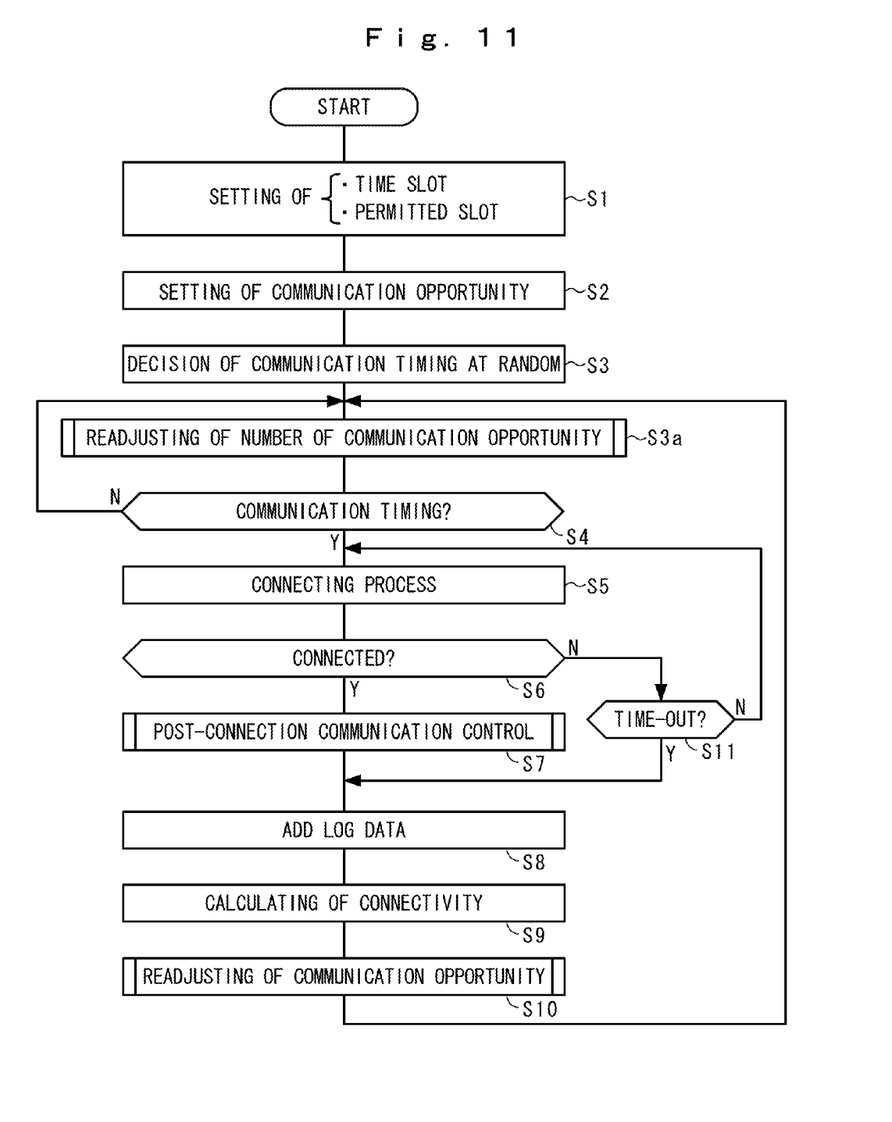
FIG. 11 is a flowchart illustrating an operation according to a second preferred embodiment of the present invention.

Hence, in a second preferred embodiment shown in FIG. 11, a step of modifying the number of communication opportunities (Step S3a) is added immediately before Step S4 so that the communication can be restarted on an optimized manner even after the power is turned on again.

Figure 12:
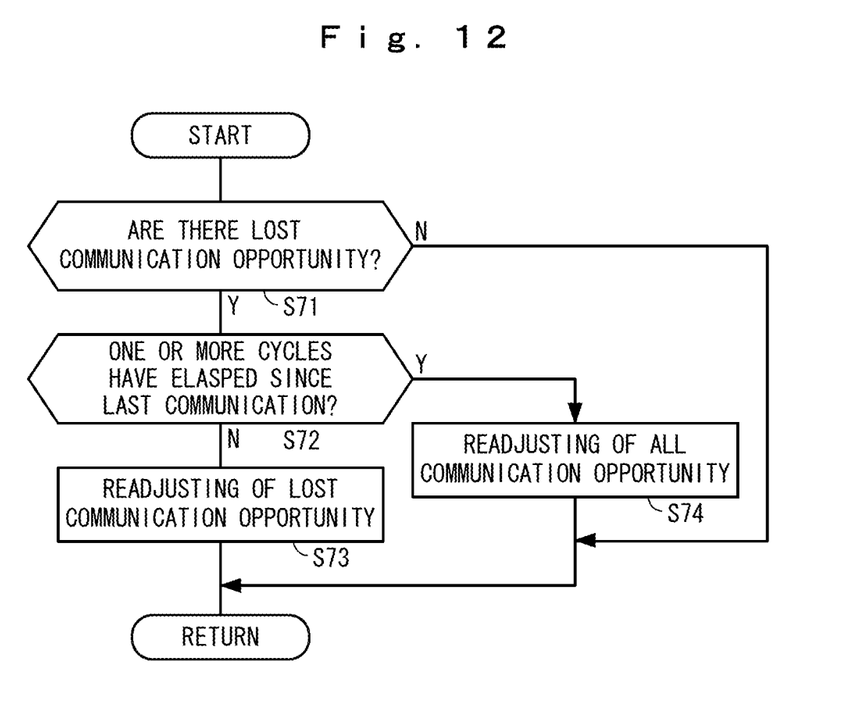
FIG. 12 is a flowchart illustrating a procedure of communication schedule modification.

FIG. 12 is a flowchart illustrating a procedure of the modification to be performed in Step S3a. For the purposes of description, here, the case of modifying the lost communication opportunities due to the power-off is exemplified.

In Step S71, if it is determined that there is a lost or elapsed communication opportunity without consumption, it is determined in Step S72 whether or not one (24 hours in this embodiment) or more cycles have elapsed since the last timing of the communication. If not, the routine goes to Step S73 in which the communication opportunity lost due to for example power-off is readjusted based on the latest connectivity M [0] to M [3] (immediately before the power-off). That is, a simulation of the communication opportunity is performed for each communication opportunity that is lost, and the number of communication opportunities, C [0] to C [7], are updated on the assumption that communication opportunities are assigned based on the latest connectivity M [0] to M [3].

On the other hand, if it is determined that one or more cycles have elapsed since the last communication timing, the routine goes to Step S74 in which all the number of communication opportunities, C [0] to C [7], are reset based on the latest connectivity M [0] to M [3] (immediately before the power-off).

What is claimed is:

1. A wireless terminal for assigning more communication opportunities to a lower-congestion time slot to perform data communication in an autonomously distributed manner, the wireless terminal comprising:
   a communication timing determination module for determining a communication timing based on a communication log; and
   a connection control module for performing communication at the determined communication timing and for recording a log of the communication, wherein
   the communication timing determination module comprises:
   a permitted slot setting section for dividing one preset cycle into a plurality of time slots and for setting some of the time slots, respectively, as communication permitted slots;
   a communication assigning section for assigning a communication opportunity to each communication permitted slot based on the number of communication opportunities per one cycle;
   a communication timing determining section for determining the timing of the assigned communication opportunity in each communication permitted slot;
   a connectivity estimating section for estimating the connectivity of each communication permitted slot based on the communication log; and
   a communication readjusting section for readjusting the communication during each communication permitted slot so that more communication opportunities are assigned to a communication permitted slot with a higher connectivity, and wherein communications are performed during communication opportunities of the readjusted number of communication opportunities and repeated in each communication permitted slot.

2. The wireless terminal according to claim 1, wherein the connectivity estimating section is configured to obtain the connectivity of each communication permitted slot as a ratio where their sum adds up to 1 in one cycle thereof, and wherein the communication readjusting section is configured to assign communication opportunities consumed during each communication permitted slot in the current cycle to one of the communication permitted slots in the next and subsequent cycles at a probability according to the ratio of the connectivity.

3. The wireless terminal according to claim 2, wherein the communication readjusting section is configured, each time one communication opportunity is consumed during each communication permitted slot in the current cycle, to assign the consumed communication opportunity to one of the communication permitted slots in the next and subsequent cycles at a probability according to the ratio of the connectivity.

4. The wireless terminal according to claim 2, wherein the connectivity estimating section is configured to obtain the connectivity of some of the communication permitted slots with a higher connectivity as a ratio where their sum adds up to 1 in one cycle thereof, and wherein the communication readjusting section is configured to assign communication opportunities consumed during each communication permitted slot in the current cycle to one of some of the communication permitted slots in the next and subsequent cycles at a probability according to the ratio of the connectivity.

5. The wireless terminal according to claim 3, wherein the connectivity estimating section is configured to obtain the connectivity of some of the communication permitted slots with a higher connectivity as a ratio where their sum adds up to 1 in one cycle thereof, and wherein the communication readjusting section is configured to assign communication opportunities consumed during each communication permitted slot in the current cycle to one of some of the communication permitted slots in the next and subsequent cycles at a probability according to the ratio of the connectivity.

6. The wireless terminal according to claim 1, wherein a maximum number of communication opportunity is set in each communication permitted slot, and the communication readjusting section is configured to assign communication opportunities to each communication permitted slot within a range not higher than the maximum number.

7. The wireless terminal according to claim 2, wherein a maximum number of communication opportunity is set in each communication permitted slot, and the communication readjusting section is configured to assign communication opportunities to each communication permitted slot within a range not higher than the maximum number.

8. The wireless terminal according to claim 1, wherein a minimum number of communication opportunity is set in each communication permitted slot, and the communication readjusting section is configured to assign communication opportunities to each communication permitted slot within a range not lower than the minimum number.

9. The wireless terminal according to claim 2, wherein a minimum number of communication opportunity is set in each communication permitted slot, and the communication readjusting section is configured to assign communication opportunities to each communication permitted slot within a range not lower than the minimum number.

10. The wireless terminal according to claim 1, wherein the connectivity of each communication permitted slot is estimated based on one of either the call loss rate or the successful call rate and the average throughput of the communication performed in the communication permitted slot.

11. The wireless terminal according to claim 2, wherein the connectivity of each communication permitted slot is estimated based on one of either the call loss rate or the successful call rate and the average throughput of the communication performed in the communication permitted slot.

12. The wireless terminal according to claim 1, wherein the connection control module is configured to terminate the current communication when the communication holding time or the data volume of communication exceeds a prescribed upper limit.

13. The wireless terminal according to claim 2, wherein the connection control module is configured to terminate the current communication when the communication holding time or the data volume of communication exceeds a prescribed upper limit.

14. The wireless terminal according to claim 1, wherein the connection control module is configured to forcibly terminate the current communication if the communication holding time or the data volume of communication exceeds a minimum guaranteed value and when the throughput becomes lower than a preset lower limit.

15. The wireless terminal according to claim 2, wherein the connection control module is configured to forcibly terminate the current communication if the communication holding time or the data volume of communication exceeds a minimum guaranteed value and when the throughput becomes lower than a preset lower limit.

16. The wireless terminal according to claim 1, wherein the communication timing determination module is configured to detect a no-communication period during which no communication opportunity is consumed and the communication during each communication permitted slot is not readjusted after recovery from the no-communication period, and wherein the communication readjusting section is configured to readjust the number of communication opportunity during each communication permitted slot on the assumption that communication opportunities are consumed during the no-communication period and the number of communication opportunity is readjusted based on the connectivity estimated immediately before the no-communication period.

17. The wireless terminal according to claim 2, wherein the communication timing determination module is configured to detect a no-communication period during which no communication opportunity is consumed and the communication during each communication permitted slot is not readjusted after recovery from the no-communication period, and wherein the communication readjusting section is configured to readjust the number of communication opportunity during each communication permitted slot on the assumption that communication opportunities are consumed during the no-communication period and the number of communication opportunity is readjusted based on the connectivity estimated immediately before the no-communication period.

18. The wireless terminal according to claim 16, wherein the communication readjusting section is configured, when the no-communication period exceeds a preset reference length, to reset the number of communication opportunity during each communication permitted slot based on the connectivity estimated immediately before the no-communication period so that more communication opportunities are assigned to a communication permitted slot with a higher connectivity.

19. The wireless terminal according to claim 17, wherein the communication readjusting section is configured, when the no-communication period exceeds a preset reference length, to reset the number of communication opportunity during each communication permitted slot based on the connectivity estimated immediately before the no-communication period so that more communication opportunities are assigned to a communication permitted slot with a higher connectivity.

\* \* \* \* \*